United States Patent
Kim et al.

(10) Patent No.: US 11,218,948 B2
(45) Date of Patent: Jan. 4, 2022

(54) V2X COMMUNICATION DEVICE AND DATA COMMUNICATION METHOD THEREFOR

(71) Applicant: LG Electronics Inc., Seoul (KR)

(72) Inventors: Soyoung Kim, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/476,727

(22) PCT Filed: Jan. 9, 2017

(86) PCT No.: PCT/KR2017/000253
§ 371 (c)(1),
(2) Date: Jul. 9, 2019

(87) PCT Pub. No.: WO2018/128209
PCT Pub. Date: Jul. 12, 2018

(65) Prior Publication Data
US 2019/0364484 A1    Nov. 28, 2019

(51) Int. Cl.
*H04W 48/10* (2009.01)
*H04W 4/50* (2018.01)
*H04W 4/40* (2018.01)
*H04W 28/06* (2009.01)
*H04W 48/18* (2009.01)

(52) U.S. Cl.
CPC ............ *H04W 48/10* (2013.01); *H04W 4/40* (2018.02); *H04W 4/50* (2018.02); *H04W 28/06* (2013.01); *H04W 48/18* (2013.01)

(58) Field of Classification Search
CPC ......... H04W 48/10; H04W 4/50; H04W 4/40; H04W 28/06; H04W 48/18
See application file for complete search history.

(56) References Cited

U.S. PATENT DOCUMENTS

| 7,688,854 | B2 | 3/2010 | Hwang |
| 9,147,294 | B1* | 9/2015 | Weinfield .............. H04W 4/027 |
| 2008/0253322 | A1* | 10/2008 | So ....................... H04L 63/0892 370/329 |
| 2009/0129323 | A1 | 5/2009 | Chen et al. |

(Continued)

FOREIGN PATENT DOCUMENTS

KR    20060060051    6/2006

OTHER PUBLICATIONS

IEEE, "IEEE Standard for Wireless Access in Vehicular Environments—Security Services for Applications and Management Messages", 2016, IEEE Vehicular Technology Society (Year: 2016).*

(Continued)

*Primary Examiner* — Peter P Chau
(74) *Attorney, Agent, or Firm* — Fish & Richardson P.C.

(57) ABSTRACT

Disclosed is a method for communicating data of a V2X communication apparatus. The method for communicating data of a V2X communication apparatus according to an embodiment of the present invention includes receiving service advertisement information for announcing a service; and receiving service data based on the service advertisement information, the service advertisement information includes at least one of a header and a service information segment or a channel information segment.

12 Claims, 18 Drawing Sheets

(a)

(b)

(56) References Cited

U.S. PATENT DOCUMENTS

| | | | |
|---|---|---|---|
| 2010/0019891 A1* | 1/2010 | Mudalige | G08G 1/167 340/425.5 |
| 2012/0258669 A1 | 10/2012 | Honkanen et al. | |
| 2014/0059235 A1 | 2/2014 | Palin et al. | |
| 2016/0037483 A1 | 2/2016 | Du et al. | |
| 2018/0206089 A1* | 7/2018 | Cavalcanti | H04W 36/0083 |
| 2018/0324560 A1* | 11/2018 | Xu | H04W 76/11 |

OTHER PUBLICATIONS

Korean Office Action in Korean Appln. No. 10-2019-7020287, dated Jul. 23, 2020, 6 pages (with English translation).

* cited by examiner

[FIG. 1]
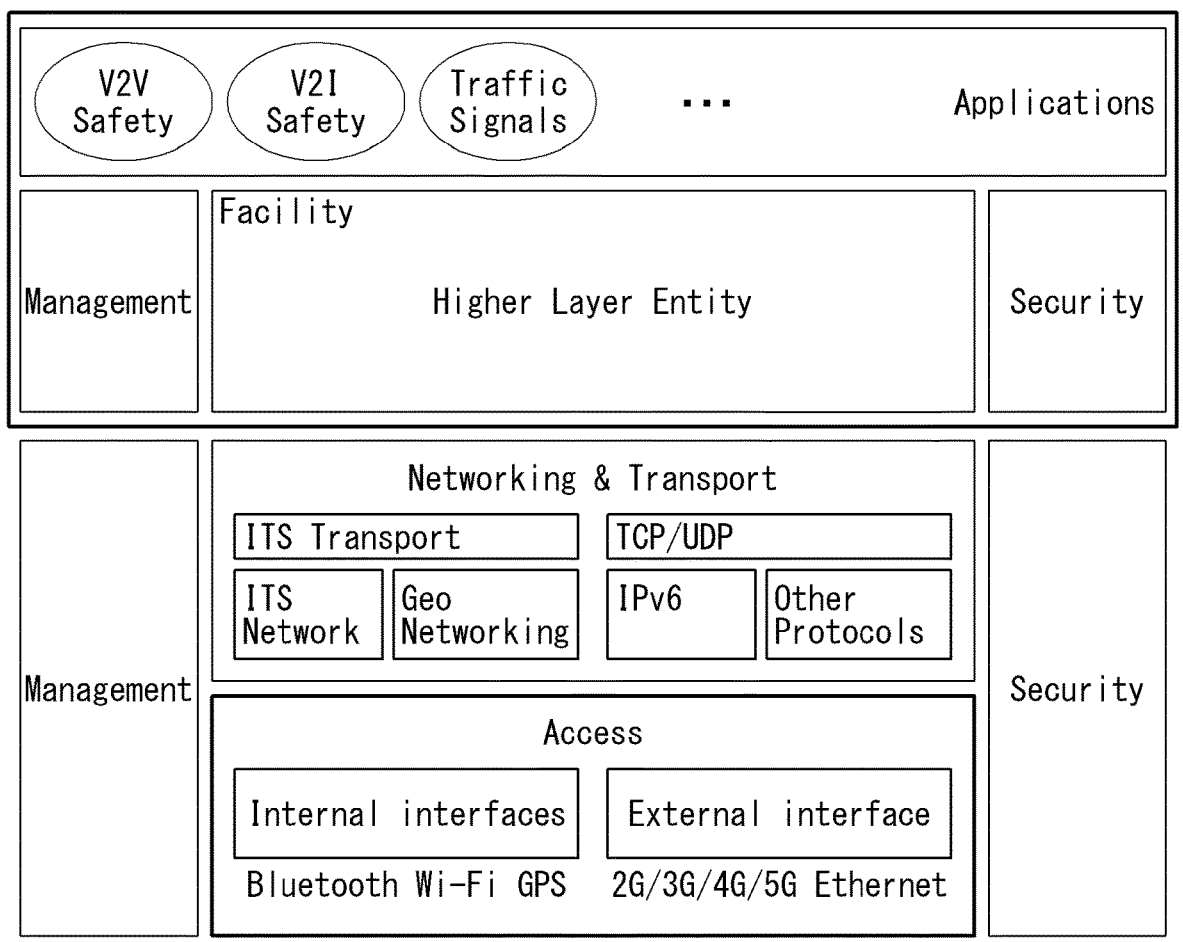

[FIG. 2]
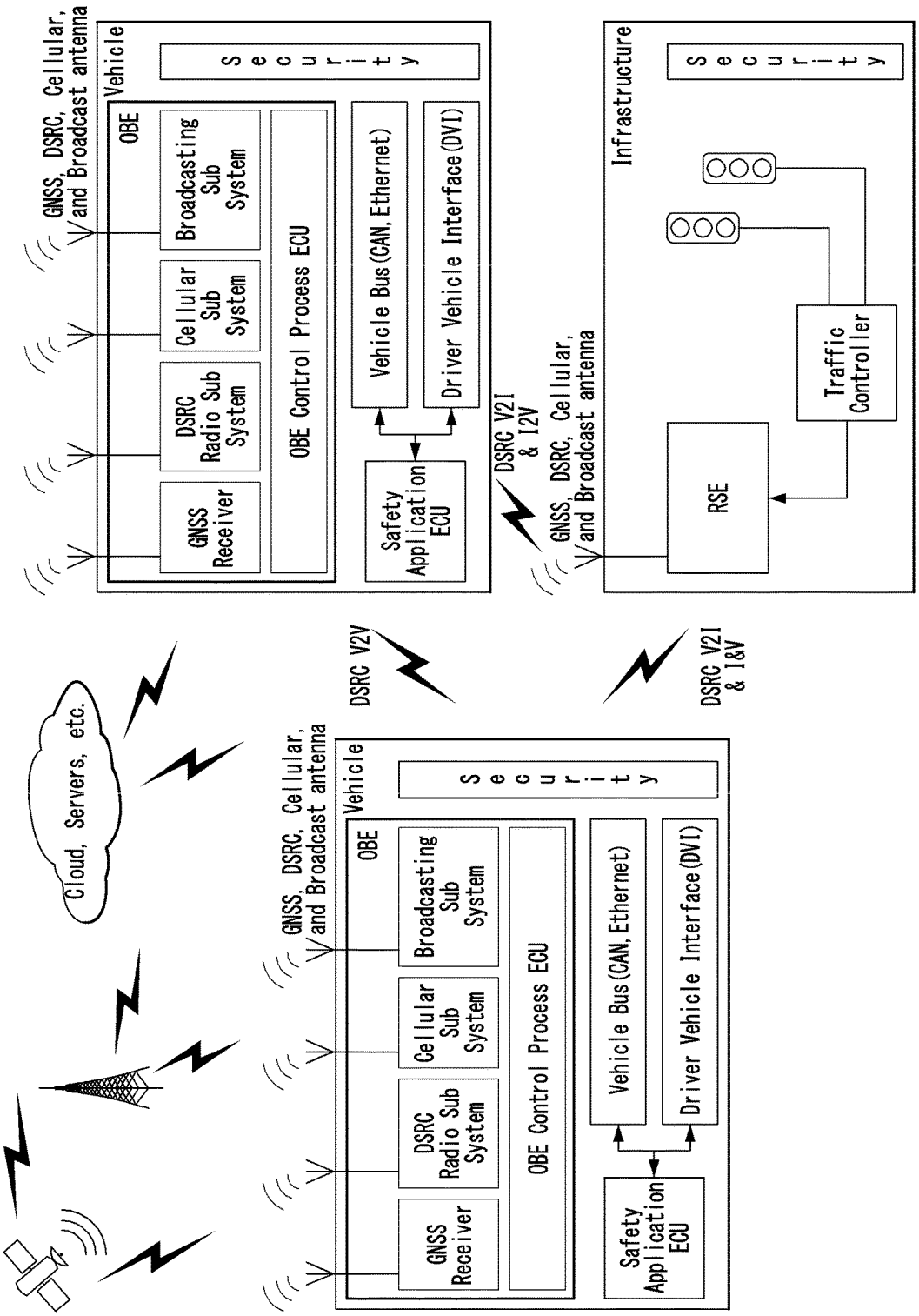

[FIG. 3]
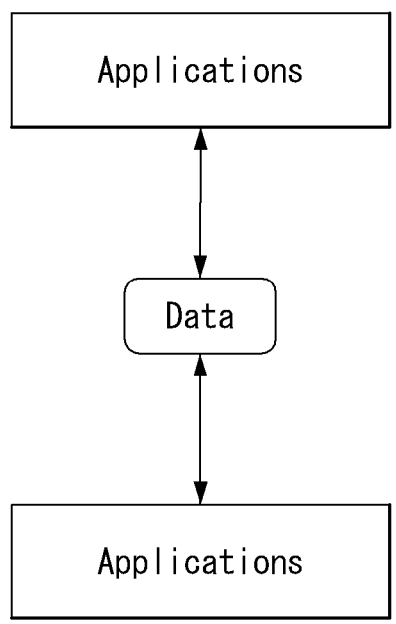
(a)
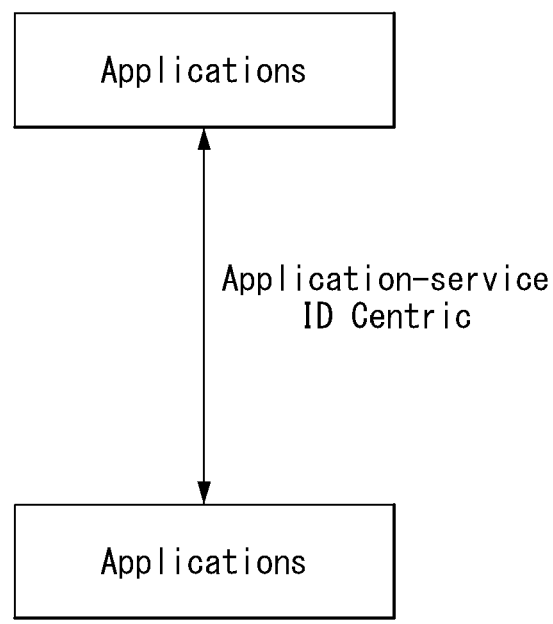
(b)

[FIG. 4]
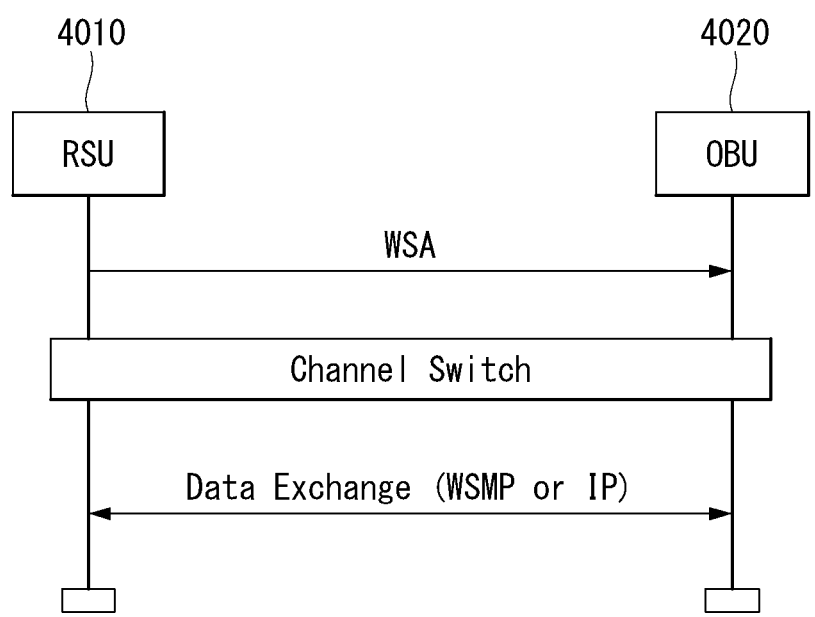

[FIG. 5]
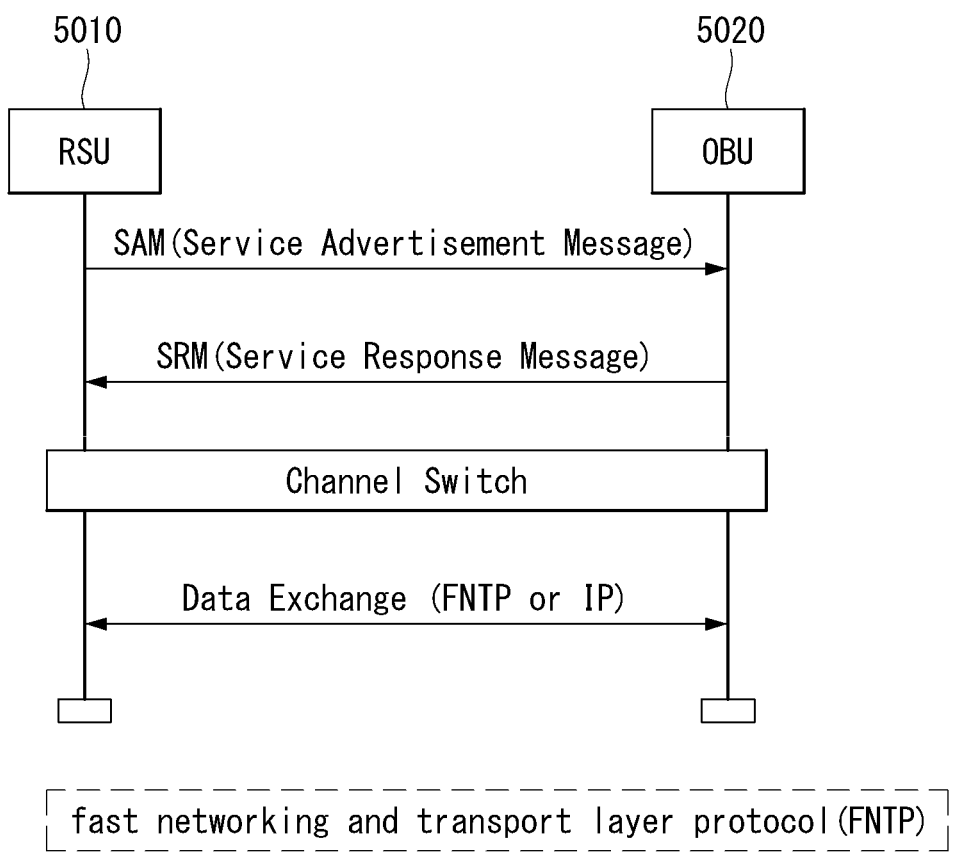

[FIG. 6]
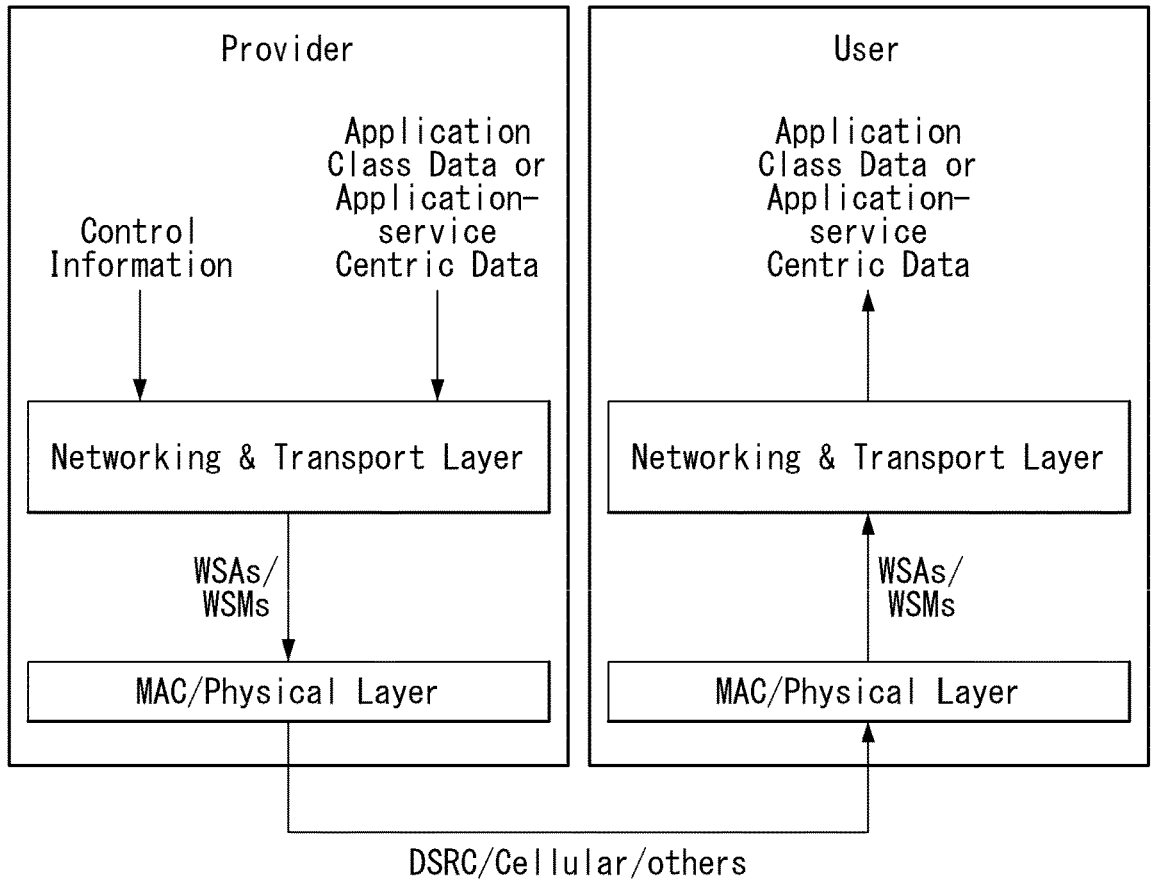
[FIG. 7]
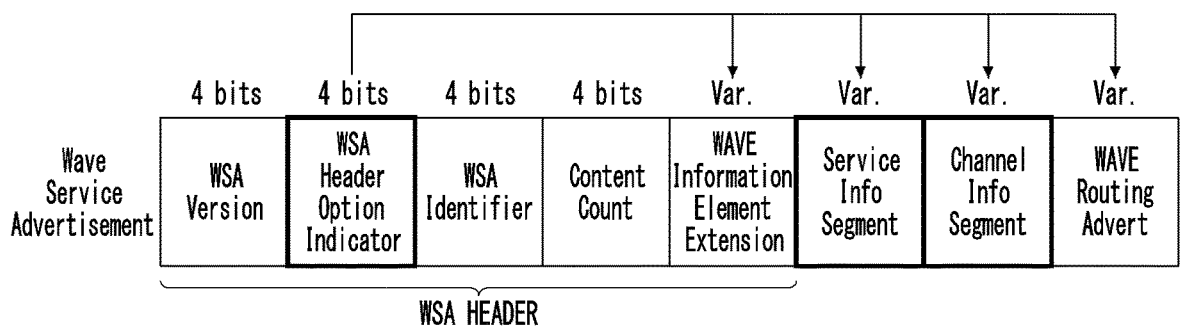

[FIG. 8]
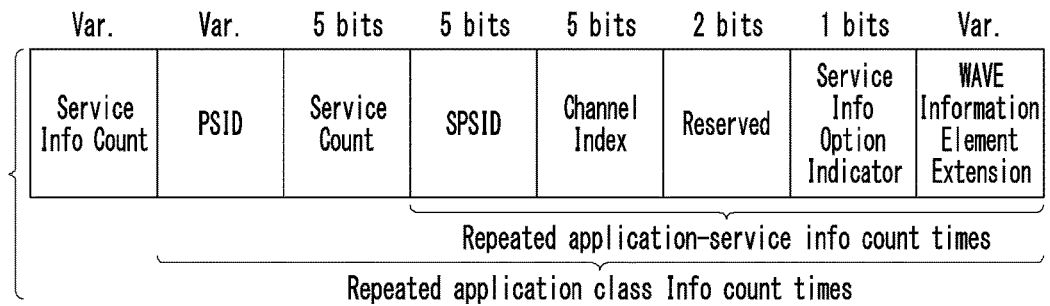
(a)
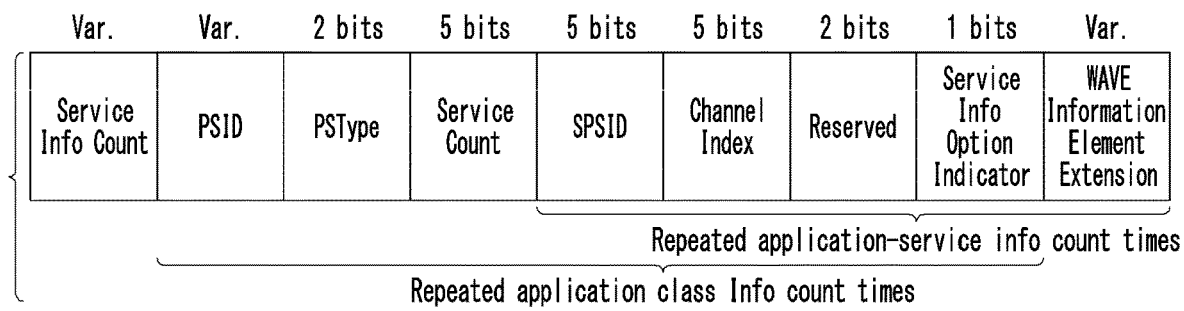
(b)
[FIG. 9]
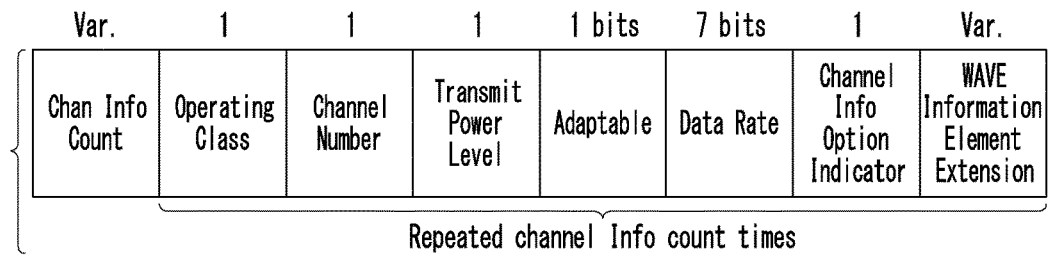

[FIG. 10]

| | Var. | Var. | 8 bits | 8 bits | 5 bits | 2 bits | 1 bits | Var. |
|---|---|---|---|---|---|---|---|---|
| | Service Info Count | PSID | Service Count | SPSID | Channel Index | Reserved | Service Info Option Indicator | WAVE Information Element Extension |
| (a) | 1 | 0x10 | 0 | 0 | Channel Index | Reserved | 0 | |
| (b) | 1 | 0x10 | 1 | 2 | Channel Index | Reserved | 1 | Repeat Rate (1) |
| (c) | 1 | 0x10 | 3 | 2 | Channel Index | Reserved | 1 | 2DLocation |
| | | | | 3 | Channel Index | Reserved | 0 | |
| | | | | 3 | Channel Index | Reserved | 0 | |
| (d) | 2 | 0x10 | 3 | 2 | Channel Index | Reserved | 1 | 2DLocation |
| | | | | 3 | Channel Index | Reserved | 0 | |
| | | | | 5 | Channel Index | Reserved | 0 | |
| | | 0x50 | 2 | 1 | Channel Index | Reserved | 0 | |
| | | | | 2 | Channel Index | Reserved | 1 | 3DLocation |

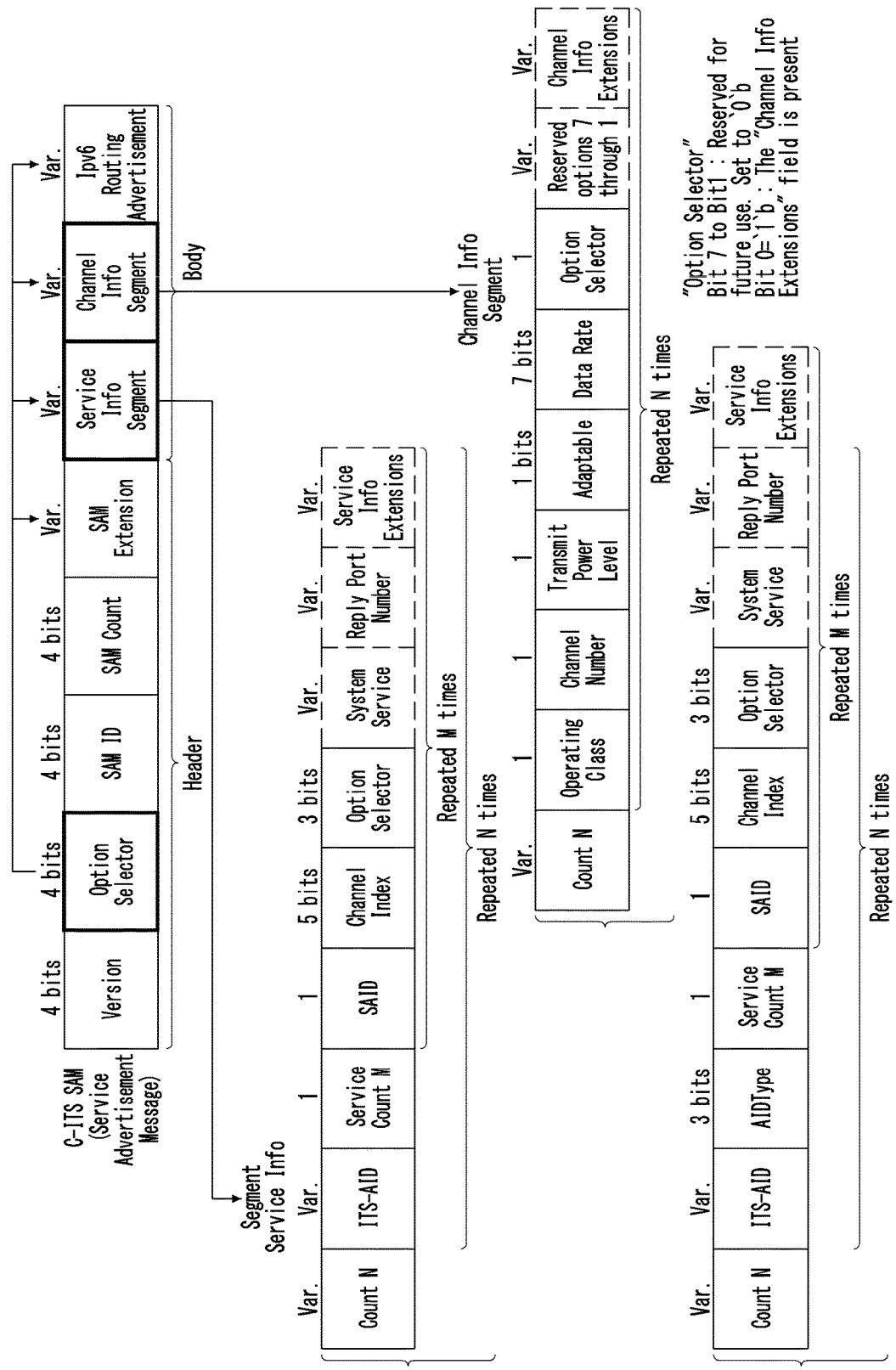
[FIG. 11]

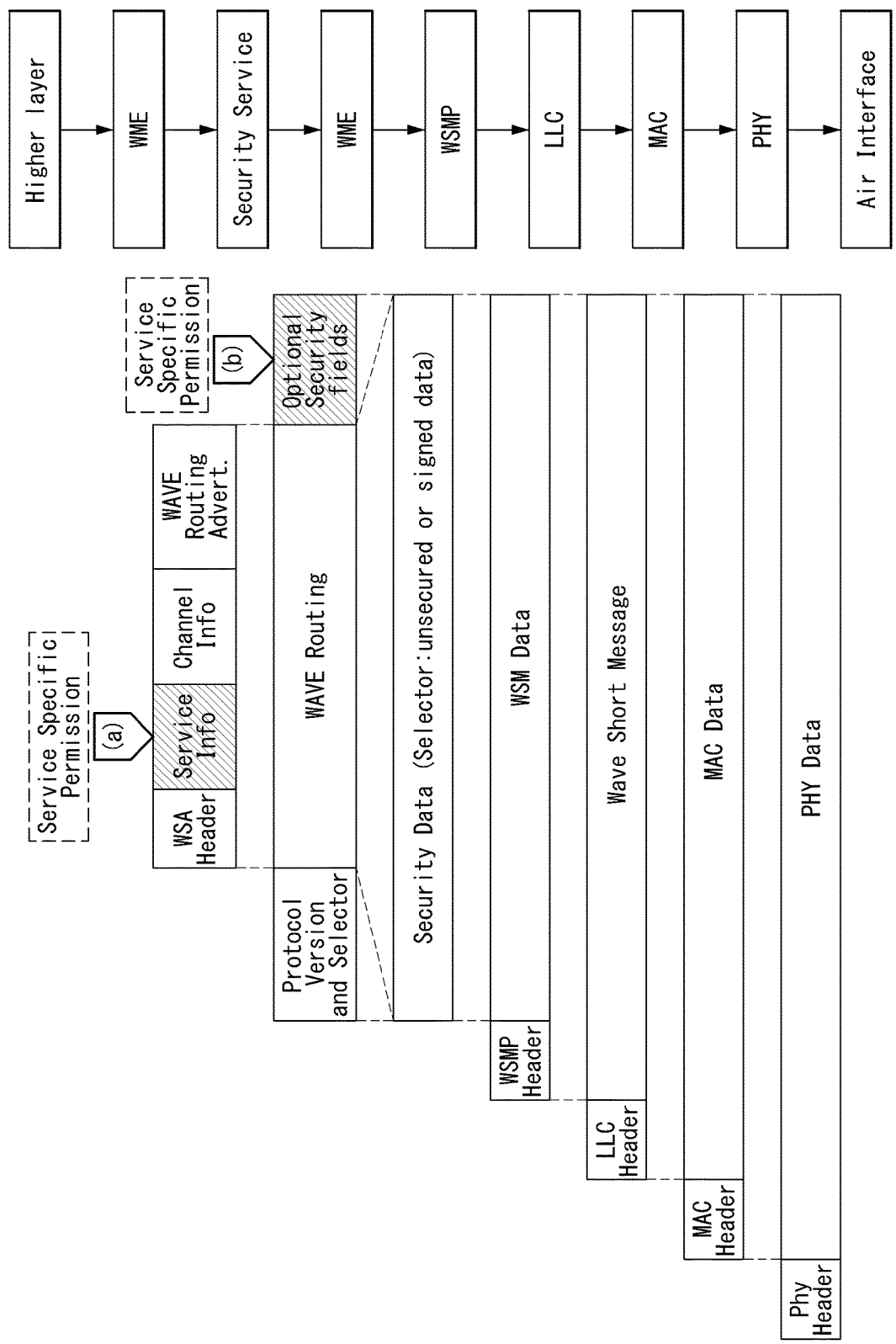
[FIG. 12]

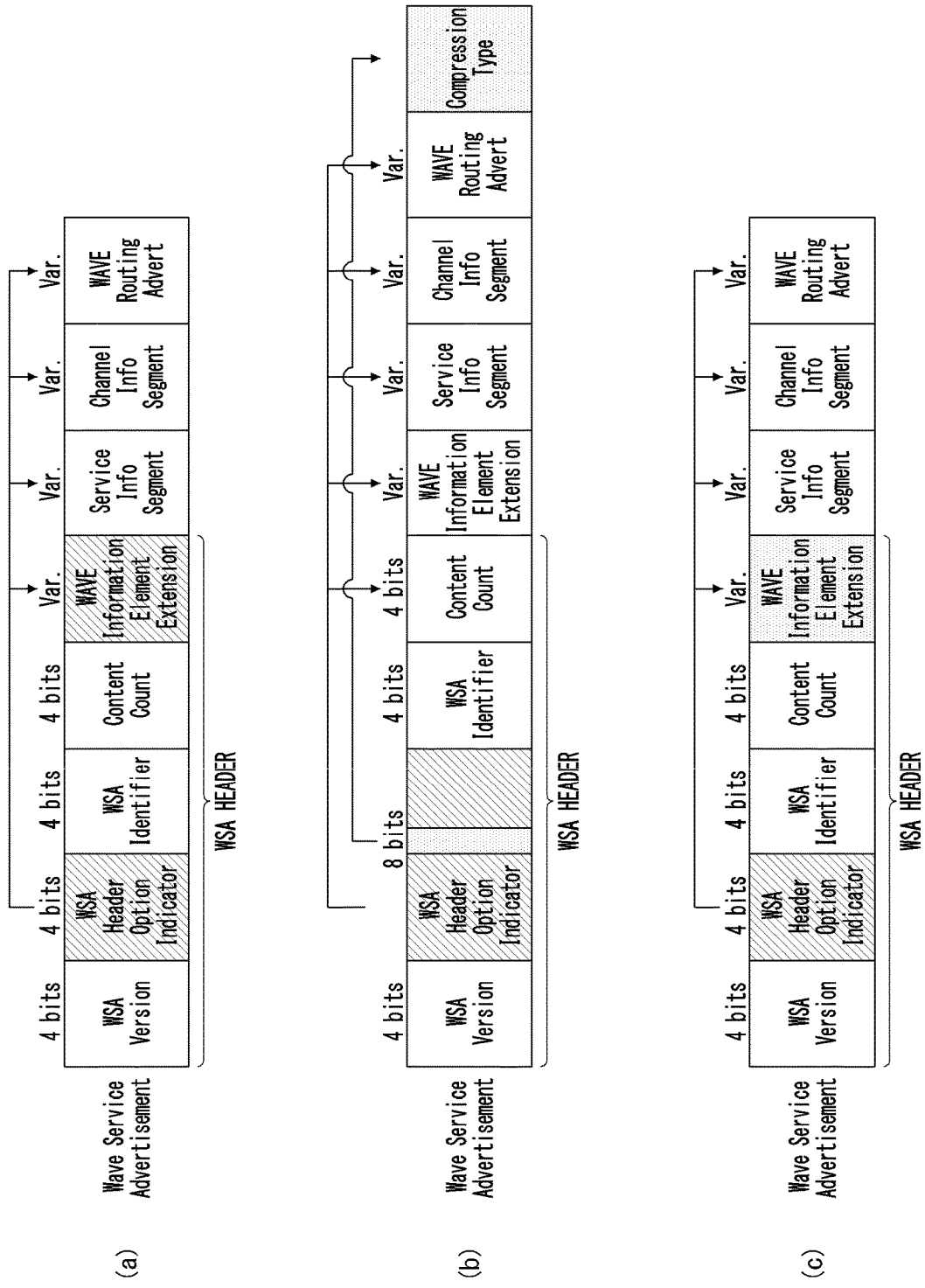
[FIG. 13]

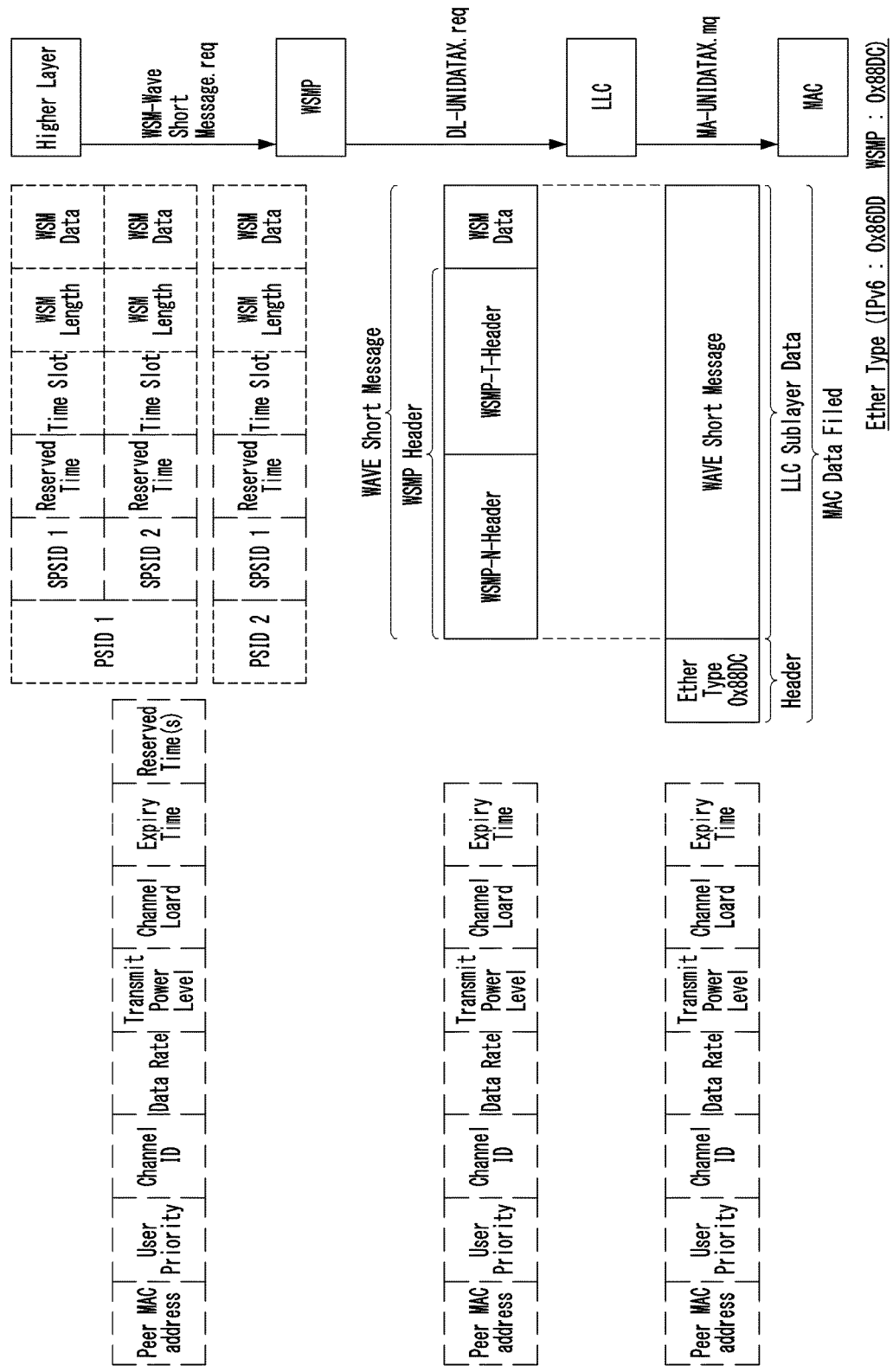
[FIG. 14]

[FIG. 15]

| Provider Service Request Table | Sequence of channel service request table entry | ProviderServiceRequestTableIndex | | | | | | | | | Status |
|---|---|---|---|---|---|---|---|---|---|---|---|
| | | WsaType | | | | | | | | | |
| | | ProviderServiceIdentifier | | | | | | | | | |
| | | ProviderServiceContext | | | | | | | | | |
| | | ProviderChannelAccess | | | | | | | | | |
| | | ProviderBestAvailble | | | | | | | | | |
| | | ProviderOperatingClass | | | | | | | | | |
| | | NumofSPSIDs | | | | | | | | | |
| | | | SPSID | | | | | | | | |
| | | | SSP | | | | | | | | |
| | | | Reserved Time | | | | | | | | |
| | | | ..... | | | | | | | | |

[FIG. 16]

| Provider Service Request Table | Sequence of channel service request table entry | UserServiceRequestTableIndex | |
|---|---|---|---|
| | | UserServiceRequestType | |
| | | UserServiceRequestProviderServiceIdentifier | |
| | | UserServiceRequestProviderServiceContext | |
| | | NumofSPSIDs | |
| | | | SPSID |
| | | | SSP |
| | | Status | |

[FIG. 17]

| Item | Table Entry | Contents | Type |
|---|---|---|---|
| Provider Channel Info Table | Sequence of channel service request table entry | ProviderChannelInfoTableIndex | Capability |
| | | ProviderChannelInfoOperatingClass | |
| | | ProviderChannelInfoChannelNumber | |
| | | ProviderChannelInfoAdaptable | |
| Provider Wave Routing Advertisement | | ... | Capability |
| User Service Request Table | Sequence of channel service request table entry | UserServiceRequestTableIndex | Status |
| | | UserServiceRequestType | |
| | | UserServiceRequestProviderServiceIdentifier | |
| | | UserServiceRequestProviderServiceContext | |
| | | UserServiceRequestPriority | |
| | | UserServiceRequestWsaType | |
| | | ... | |
| User Available Service Table | Sequence of channel service request table entry | UserAvailableServiceTableIndex | Status |
| | | UserAvailableWsaType | |
| | | UserAvailableResultCode | |
| | | UserAvailableGenerationTime | |
| | | UserAvailableReservedTime | |
| | | ... | |

[FIG. 18]
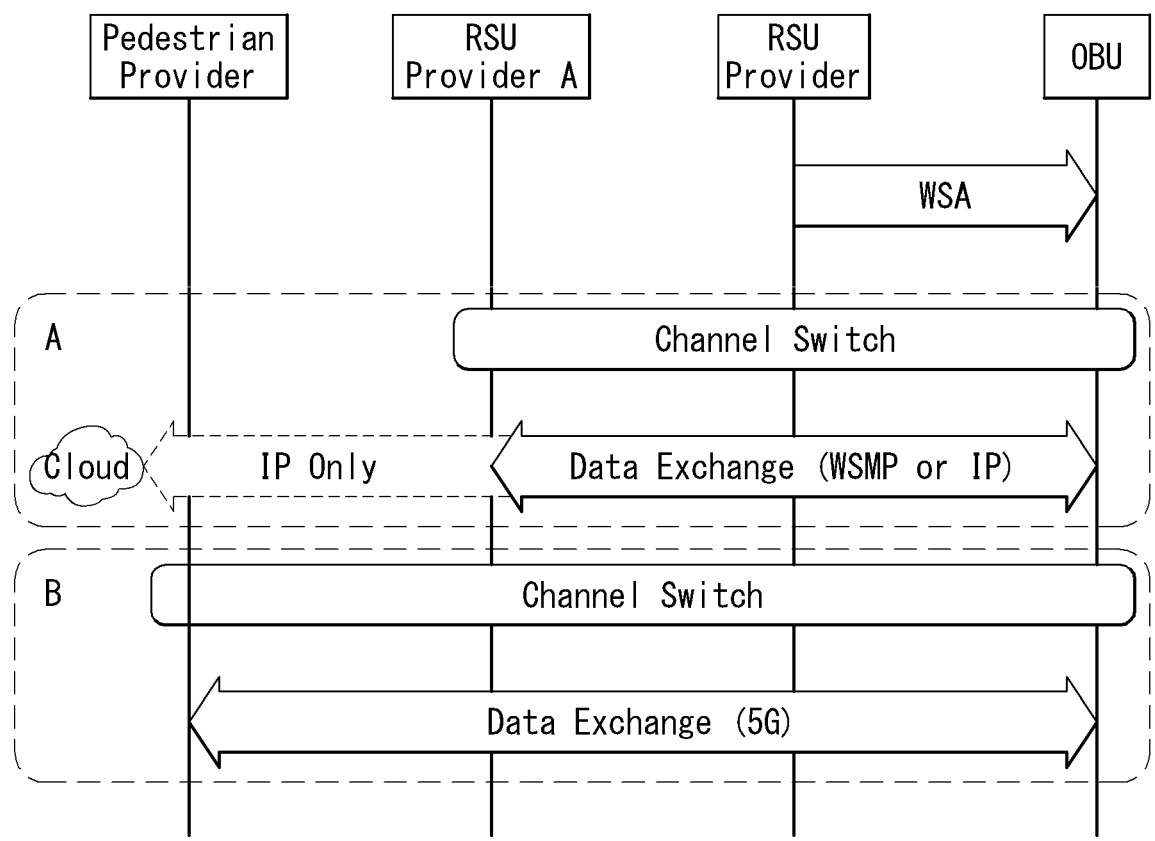

[FIG. 19]
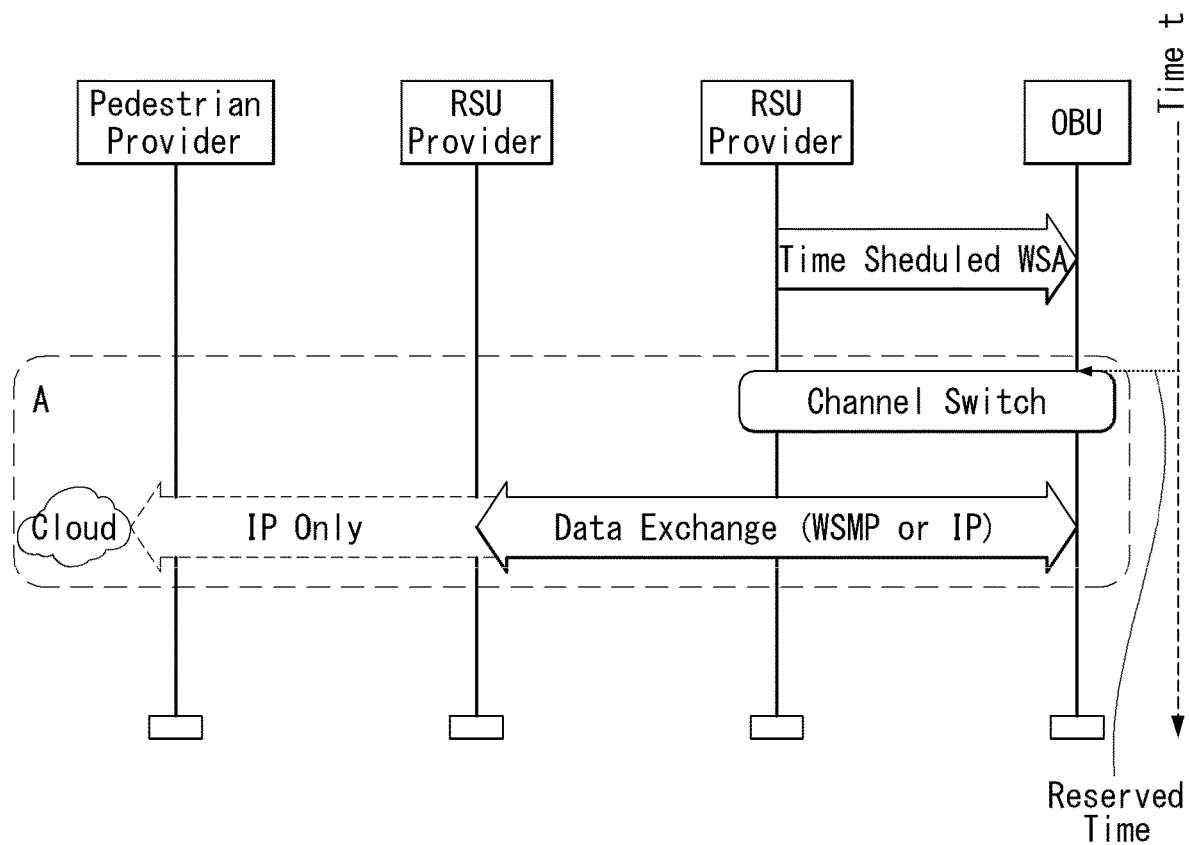
[FIG. 20]
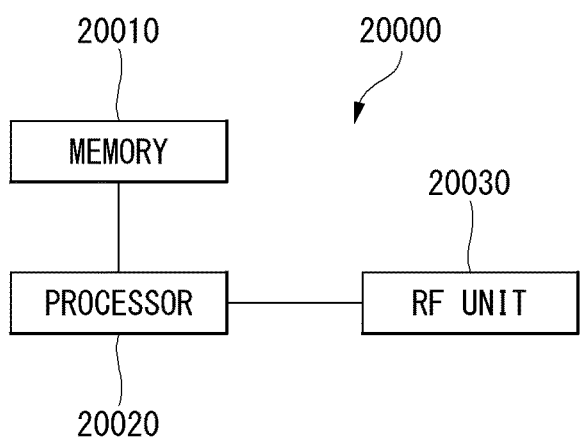

[FIG. 21]
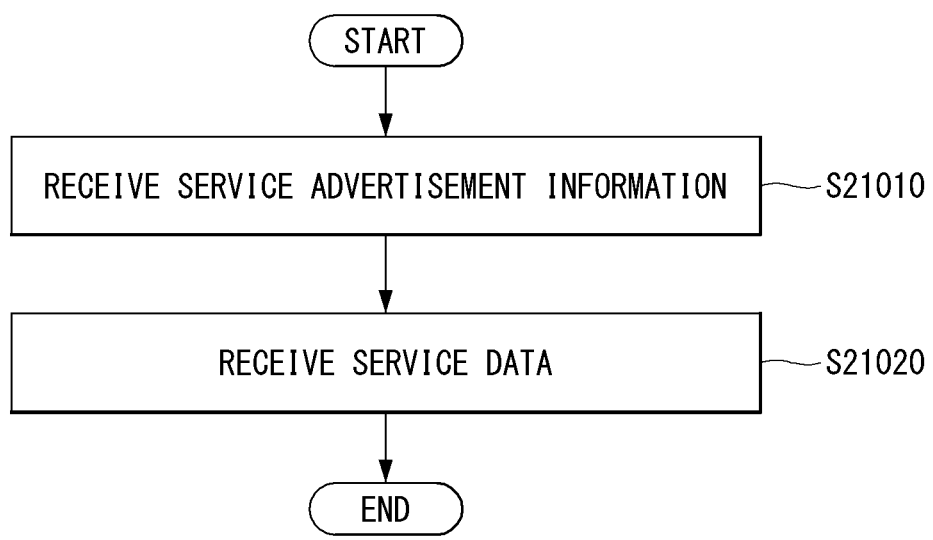

V2X COMMUNICATION DEVICE AND DATA COMMUNICATION METHOD THEREFOR

CROSS-REFERENCE TO RELATED APPLICATIONS

This application is a National Stage application under 35 U.S.C. § 371 of International Application No. PCT/KR2017/000253, filed on Jan. 9, 2017, the contents of which are incorporated by reference in its entirety.

TECHNICAL FIELD

The present invention relates to a method and apparatus for V2X communication, and more particularly, relates to a data communication method for receiving service advertisement information a data service based on the service advertisement information.

BACKGROUND ART

In recent years, a vehicle has become a result of complex industrial technology, which is a fusion of electric, electronic, and communication technologies, centering on mechanical engineering and the vehicle is also called a smart car in such an aspect. A smart car has been providing various customized mobile services as well as traditional vehicle technology such as traffic safety/complicatedness by connecting drivers, vehicles, and transportation infrastructures. The connectivity may be implemented using vehicle to everything (V2X) communication technology. The system that provides the connectivity may be referred to as a connected vehicle system.

DISCLOSURE

Technical Problem

As the connectivity of vehicles become enforced and increased, the amounts and types of services targeted to V2X communication become increased. As the mount of service data exchanged by V2X communication increases, it is a method for distinguishing the service data in detail. In addition, it is required a method transmitting and receiving service advertisement information that may provide non-real time services.

Technical Solution

In order to solve the technical problem, a method for communicating data of a V2X communication apparatus according to an embodiment of the present invention includes receiving service advertisement information for announcing a service; and receiving service data based on the service advertisement information, the service advertisement information includes at least one of a header and a service information segment or a channel information segment, the header includes option indicator information indicating whether at least one of the service information segment or the channel information segment, the service information segment provides information related to the service, the channel information segment provides information related to a channel through which the service is provided, and the service information segment includes provider service ID (PSID) information identifying an application area and sub-provider service ID (SPSID) information identifying a service included in the application area.

According to the method for communicating data by a V2X communication apparatus according to an embodiment of the present invention, the service information segment may further include service count information representing the number of services identified by the SPSID information.

In addition, according to the method for communicating data by a V2X communication apparatus according to an embodiment of the present invention, the service advertisement information may further include compression information indicating at least one of whether to compress the service advertisement information or a compression type.

In addition, according to the method for communicating data by a V2X communication apparatus according to an embodiment of the present invention, the service advertisement information may further include reserved time information for non-real time service access.

In addition, according to the method for communicating data by a V2X communication apparatus according to an embodiment of the present invention, the method may further include filtering desired service data based on the PSID information and the SPSID information; and processing the filtered desired service data.

In addition, according to the method for communicating data by a V2X communication apparatus according to an embodiment of the present invention, the service advertisement information may further include Service Specific Permission (SSP) information representing whether to allow a transmission for the service.

In order to solve the technical problem, a V2X communication apparatus according to an embodiment of the present invention includes a memory configured to store data; an RF unit configured to transmit and receive a radio signal; and a processor configured to control the RF unit, wherein the V2X communication apparatus is configured to: receive service advertisement information for announcing a service; and receive service data based on the service advertisement information, the service advertisement information includes at least one of a header and a service information segment or a channel information segment, the header includes option indicator information indicating whether at least one of the service information segment or the channel information segment, the service information segment provides information related to the service, the channel information segment provides information related to a channel through which the service is provided, and the service information segment includes provider service ID (PSID) information identifying an application area and sub-provider service ID (SPSID) information identifying a service included in the application area.

Technical Effects

According to the present invention, a service advertisement centering on application-service ID is used additionally in addition to the data distribution scheme in a unit of application class/area, an efficient message communication may be provided. Particularly, even in the congestion situation in which an amount of message is concentrated, an efficient message communication and a service in accordance with characteristic/situation of a user may be provided. The present invention may provide a data communication method to which various communication techniques may be flexibly applied.

The other effect of the present invention will be described in the following specification.

DESCRIPTION OF DRAWINGS

The accompanying drawings, which are included to provide a further understanding of the present invention and are incorporated in and constitute a part of this application, illustrate embodiments of the present invention together with the detailed description serving to describe the principle of the present invention.

FIG. 1 illustrates a protocol stack of a connected vehicle system according to an embodiment of the present invention.

FIG. 2 illustrates a communication between V2X communication apparatuses according to an embodiment of the present invention.

FIG. 3 illustrates a V2X communication method according to an embodiment of the present invention.

FIG. 4 illustrates a V2X communication method of a V2X apparatus according to an embodiment of the present invention.

FIG. 5 illustrates a V2X communication method of a V2X apparatus according to another embodiment of the present invention.

FIG. 6 illustrates a V2X communication method of a V2X communication apparatus according to another embodiment of the present invention.

FIG. 7 illustrates a format of WAVE Service Advertisement (WSA) information according to an embodiment of the present invention.

FIG. 8 illustrates a service information segment of WAVE Service Advertisement (WSA) according to an embodiment of the present invention.

FIG. 9 illustrates a channel information segment of WAVE Service Advertisement (WSA) according to an embodiment of the present invention.

FIG. 10 illustrates a channel information segment of WSA according to an embodiment of the present invention.

FIG. 11 illustrates Service Advertisement Message (SAM) format according to an embodiment of the present invention.

FIG. 12 illustrates a method for transmitting Service Specific Permission according to an embodiment of the present invention.

FIG. 13 illustrates a method for indicating a compression according to an embodiment of the present invention.

FIG. 14 illustrates service advertisement information that supports non-real time service based on an application class or an application-service.

FIG. 15 illustrates additional content of a provider service request table for the application-service for the MIB according to an embodiment of the present invention.

FIG. 16 illustrates additional content of a user service request table for the application-service for the MIB according to an embodiment of the present invention.

FIG. 17 illustrates additional content of a reserved time for non-real time service to the MIB according to an embodiment of the present invention.

FIG. 18 illustrates a method for receiving a hybrid service of a V2X communication apparatus according to an embodiment of the present invention.

FIG. 19 illustrates a method for receiving a non-real time service of a V2X communication apparatus according to an embodiment of the present invention.

FIG. 20 illustrates a block diagram of a V2X communication apparatus according to an embodiment of the present invention.

FIG. 21 is a flowchart illustrating a data communication method of a V2X communication apparatus according to an embodiment of the present invention.

BEST MODE FOR INVENTION

Preferred embodiments of the present invention are described in detail and examples thereof are illustrated in the accompanying drawings. The following detailed description with reference to the accompanying drawings is intended to illustrate the preferred embodiments of the present invention rather than merely illustrating embodiments that may be implemented according to embodiments of the present invention. The following detailed description includes details to provide a thorough understanding of the present invention, but the present invention does not require all these details. In the present invention, respective embodiments described below need not be particularly used separately. Multiple embodiments or all embodiments may be together used, and specific embodiments may be used as a combination.

Most of the terms used in the present invention are selected from the general ones that are widely used in the field, but some terms are arbitrarily selected by the applicant and the meaning thereof will be described in detail in the following description as necessary. Accordingly, the invention should be understood based on the intended meaning of the term rather than the mere name or meaning of the term.

The present invention relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The V2X apparatus may correspond to a road side unit (RSU) of the infrastructure or may be included in the RSU. Alternatively, the V2X communication apparatus may correspond to an ITS station or may be included in the ITS station. As an embodiment, the V2X apparatus may operate in Wireless Access In Vehicular Environments (WAVE) system of IEEE 1609.1 to 4.

A connected vehicle system defines V2X communication protocol for communication with a vehicle and all types of other devices included in the vehicle. The safety use case for Vehicle to Vehicle (V2V) communication, Vehicle to Infrastructure (V2I) communication and Infrastructure to Vehicle (I2V) communication is defined first, and the provided services are extended gradually. The service announcement technology for providing services is implemented as WAVE Service Advertisement (WSA) message and Service Announce Message (SAM) in America and Europe, respectively. That is, when a transmitter at a provider transmits messages, a receiver at a user may use service announcement information and may filter only desired services among the received messages. The receiver may filter the desired message and perform appropriate application by analyzing data of the received messages.

As an embodiment, a data distribution may be performed in a unit of application class. As the safety application concentrated use cases becomes more diversified and the amount of data to process increases, the data distribution scheme in a unit of application class has limitation in efficiency and performance. In addition, a detailed control is difficult for each of various application services in the application class. For example, even in the case that attributes such as a priority and a permission are provided for each application-service, a receiver is unable to filter these, a use method of data is very restrictive. In addition, each of the application services in a specific application area is unable to be communicated with different communication methods in a separate time, it is difficult to provide a plurality of services flexibly and efficiently. In the present disclosure, the service provided by a service provide may be referred to as a service or an application service.

Accordingly, hereinafter, it is described a method for announcing a service in a unit of application service and transmitting the service announcement. The service related information that announces a service may be referred to as a service advertisement, service advertisement information or service announcement information.

Hereinafter, the present invention provides a service type for supporting an application service centric method as well as the application class centric data distribution method. Further, the present invention provides an encapsulation method of a single format without regard to the service expression method.

The present invention provides a method for providing more detailed filtering by using information such as SPSID (SubPSID) and priority in a unit of application-service, and permission as well as filtering in a unit of application class/area through Provider Service Identifier (PSID). The PSID may also be referred to as a provider service ID. And the SPSID may also be referred to as a sub-provider service ID.

The present invention provides a method for transmitting a service announcement message in a packet format such that a service wanted by a higher layer entity may be provided in a plurality of communication methods.

The present invention provides a compression method for decreasing overhead of a packet and displaying it in a header. The present invention provides a method for transmitting and receiving triggering information of a service wanted by a higher layer entity. The present invention supports a method for supporting non-real time message exchange in the current service providing method that considers real time only. The present invention provides a method for indicating non-real time messaging scheme for non-real time message exchange.

The present invention provides an encapsulation method that may forward a message or data that may receive and filter the service provided by a higher layer entity efficiently to a physical layer in a connected vehicle system.

FIG. 1 illustrates a protocol stack of a connected vehicle system according to an embodiment of the present invention.

Application layer: The application layer may implement and support various use cases. For example, an application may provide road safety, efficient traffic information, and other application information.

Facilities layer: The facility layer may support various use-cases defined in the application layer so as to effectively implement various use-cases. For example, the facility layer may perform application support, information support, and session/communication support.

Networking & Transport layer: The network/transport layer may configure a network for vehicle communication between homogeneous/heterogeneous networks by using various transport protocols and network protocols. For example, the networking/transport layer may provide Internet connection and routing using an Internet protocol such as TCP/UDP+IPv6 or the like. Alternatively, the networking/transport layer may configure a vehicle network by using a geographical position-based protocol such as a basic transport protocol (BTP)/GeoNetworking.

Access layer: The access layer may transmit messages/data received by the upper layer through a physical channel. For example, the access layer may perform/support data communication based on IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like.

In FIG. 1, the present invention proposes a networking and transport layer structure and proposes a method for receiving information forwarded from a higher layer entity and forwarding it to the access layer in ITS network protocol packet format like WSMP. In addition, the present invention proposes a method for forwarding a service advertisement which is required for an operation of the access layer. Furthermore, in the case that a transmission of a new packet type is considered in a higher layer entity, the present invention proposes a method for forwarding it to the access layer. Based on the proposed method, a service provider may transmit service advertisement information efficiently to a user.

In FIG. 1, a higher layer including the facility layer is not dealt in IEEE 1609 standard, and Society of Automotive Engineers (SAE) defines a plurality of use cases, message sets and requirements in the application layer. In the embodiment of FIG. 1, the present invention describes an operation of the networking/transport layer in more detail below. In FIG. 1, the ITS networking may also correspond to the WSMP for America. The networking/transport layer may receive and format data and message and forward it to the access layer. The networking/transport layer may forward non-secured, signed and encrypted information according to a type of message or data. If the message or data is not non-secured message/data, the message or data passes through a security layer and may be controlled and processed by a management layer for communication.

FIG. 2 illustrates a communication between V2X communication apparatuses according to an embodiment of the present invention.

In the connected vehicle system, the V2X communication apparatuses like a vehicle and an infrastructure may include the device configuration shown in FIG. 2. The V2X communication apparatuses may communicate with each other for V2X communication by using the system protocol shown in FIG. 1.

In FIG. 2, the description for the configuration included in the V2X communication apparatus like a vehicle is as below. The V2X communication apparatus of FIG. 2 may include a plurality of antenna systems, and the antenna system configuration may be integrated or provided separately, or a combination of a part thereof.

Global Navigation Satellite Systems (GNSS) system: A satellite positioning system for computing a position, an altitude and a velocity of an object moving around the globe using a radio wave emitted from an artificial satellite. This may correspond to an antenna or the sub system for identifying position information of a vehicle, included in the V2X communication apparatus of the vehicle.

Dedicated Short Range Communication (DSRC) Radio sub system: An antenna or the sub system for transmission/reception according to DSRC protocol.

Cellular Sub System: An antenna or the sub system for cellular data communication.

Broadcasting sub System: An antenna or the sub system for transmission/reception of broadcast data.

On Board Equipment (OBE) control process Electronic Control Unit (ECU): The OBE control process ECU may be abbreviated to a controller or a processor. The controller may process a data message received from a plurality of heterosystems and perform an appropriate operation by controlling other ECUs in the vehicle. The controller may execute an application for such a data processing and controlling/driving a vehicle. In addition, the controller may process sensing data received from other ECUs in the vehicle and transmit it to external V2X communication apparatuses/vehicles. As an embodiment, all types of information in the vehicle may be transformed into a sharable standardized format through the controller. As shown in FIG. 2, a Safety Application may be executed and transmit and may transmit and receive bus and information in the vehicle such as CAN, Ethernet, and the like in the vehicle. Further, the information may be provided with a user through a Driver Vehicle Interface (DVI) such as an audio and a display of the vehicle.

The V2X communication apparatus configured as such may communicate with an infrastructure, a pedestrian and a supporting system such as Cloud/Server as well as the other vehicle.

A Road Side Equipment (RSE) may receive information of a Traffic Controller and communicate with a vehicle. The RSE may be a fixed device and operate as a provider with being connected to a Backend. However, according to an embodiment, since the RSE may collect information from a vehicle and transmit it again, the RSE may operate as a user device as well as the provider device.

FIG. 3 illustrates a V2X communication method according to an embodiment of the present invention.

In FIG. 3, FIG. 3(a) shows a V2X communication of data distribution type, and FIG. 3(b) shows a V2X communication of application-service ID forwarding type.

In FIG. 3(a), V2X communication apparatuses may transmit/receive data in a unit of application class, and this may be referred to as a data distribution type communication. In FIG. 3(b), V2X communication apparatuses may transmit/receive data centering on an application-service ID, and this may be referred to as an application-service ID centric communication.

In FIG. 3(a), the V2X communication apparatus that receives data may determine a necessary application for data filtered primarily using a PSID and execute the corresponding application. In FIG. 3(b), the V2X communication apparatus that receives data may execute a necessary service or application immediately by using an application ID.

The present invention proposes a data format and a protocol configuration scheme of the networking/transport layer for supporting both communications of the data distribution type and the application-service ID forwarding type.

FIG. 4 illustrates a V2X communication method of a V2X apparatus according to an embodiment of the present invention.

In FIG. 4, V2X apparatuses are represented as an RSU and an OBU, respectively, but the V2X apparatuses are not limited thereto.

An RSU 4010 may transmit a message that announces a service such as WAVE Service Advertisement (WSA). An OBU 4020 may monitor a channel and receive the WSA through the monitored channel. The WSA may include channel information in which a service is provided. The OBU may move to a channel indicated by the received WSA and execute data exchange. The data may be communicated with WAVE Short Message Protocol (WSMP) or Internet Protocol (IP). The channel through which the WSA is receive may be referred to as a control channel, and the channel through which the service is provided may be referred to as a service channel. The WSA corresponds to an embodiment of the service advertisement information described above.

FIG. 5 illustrates a V2X communication method of a V2X apparatus according to another embodiment of the present invention.

In FIG. 4, V2X apparatuses are represented as an RSU and an OBU, respectively, but the V2X apparatuses are not limited thereto.

An RSU 5010 may transmit a message that announces a service such as a Service Advertisement Message (SAM). An OBU 5020 may monitor a channel and receive the SAM through the monitored channel. The OBU 5020 may transmit a Service Response Message (SRM). The SAM may include channel information in which a service is provided. The OBU may move to a channel indicated by the received WSA and execute data exchange. The data may be communicated with WAVE Short Message Protocol (WSMP) or Internet Protocol (IP). The SAM corresponds to an embodiment of the service advertisement information described above. Detailed description for the SAM is described below.

As an embodiment, the SRM may include the following fields.

Version: Version is a 4-bit non-signed integer and indicates a version of service advertisement protocol.

Option selector: Option selector is 4-bit field and indicates whether an option field is present. According to a field value, the option selector may indicate whether at least one of SRM extensions field, private channel allocation request field, context information field or private channel allocation confirm field is present.

A header of the SRM may include the version field and the option selector. A body of the SRM may include at least one of SRM extensions field, private channel allocation request field, context information field or private channel allocation confirm field.

FIG. 6 illustrates a V2X communication method of a V2X communication apparatus according to another embodiment of the present invention.

As described with referring to FIG. 3(a), it is determined by a user device on which application/service is executed for the data communicated by the provider device and the user device. The module that determines an application/service to be executed by analyzing the received data may be called a Service Detection Module (SDM). In the present invention, the SDM may correspond to the networking/transport layer. A processor of the V2X communication apparatus according to an embodiment of the present invention may further include a service detection module.

In the structure shown in FIG. 6, a message type may be set for a service advertisement. In other words, a provider service type is set, and this may be transmitted. As an embodiment, PSType field of 2-bit may be included in the service advertisement/announcement message.

As an embodiment, the PSType field may represent a data distribution type when the field value is 00 and represent an application-service ID centric type when the field value is 01.

FIG. 7 illustrates a format of WAVE Service Advertisement (WSA) information according to an embodiment of the present invention.

The WSA information may include a header and a payload (or body). The header of the WSA information may include at least one of WSA version field, WSA Header Option Indicator field, WSA Identifier field, content count field or WAVE information element extension field. The payload of the WSA information may include at least one of Service Info Segment, Channel Info Segment or WAVE Routing Advert field. The description for each field/segment included in the WAS is as follows.

WSA version: WSA version indicates the version of WAS, when the WSA having a WSA version which is not supported, a V2X apparatus may not process the WSA.

WSA Header Option Indicator: This field is 4-bit, and indicates a presence of Wave Information Element Extension, Service Info Segment, Channel Info Segment and Wave Routing Advertisement with I/O, respectively.

WSA Identifier: This field may have a value between 0 to 15 and used for identifying a unique WSA.

Content Count: This field may have a value between 0 to 15 and used for determining whether the WSA is a repetition of the previous WSA having the same WSA Identifier at a receiver.

Wave Information Element Extension: This field may be used for including an additional field for the WSA in the WSA. A field such as Repeat Rate, 2DLocation, 3DLocation, Advertiser Identifier, and the like may be included in the WSA as the Wave Information Element Extension field.

Service Info Segment: This segment provides information for a service provided by an apparatus that transmits the WSA. The Service Info Segment will be described in more detail below.

Channel Info Segment: This segment provides information for a channel used by an application-service provided by an apparatus that transmits the WSA. The Channel Info Segment will be described in more detail below.

Wave Routing Advertisement (WRA): This field provides information for an infrastructure internetwork connectivity such that a receiving apparatus participates in IPv6 network which is advertised.

FIG. 8 illustrates a service information segment of WAVE Service Advertisement (WSA) according to an embodiment of the present invention.

In FIG. 8, the service information segment according to an embodiment of the present invention further includes a SPSID field. That is, in addition to the PSID that identifies a provider service or an application class, the SPSID field that identifies an application-service is added, which enables a transceiver to operate in a unit of application-service.

FIG. 8(a) shows an embodiment of an application class centric data distribution type, when a value of the service counter field is 0. FIG. 8(b) shows an embodiment of including the PSType field described above. The description for the fields/information included in FIG. 8 is as below.

Service Info Count: This field indicates the number of instances included in the service information segment.

PSID: This field is an identifier of an application area. The PSID may be a unique value globally. The PSID may identify an application class.

Service Count: The Service Count field may indicate the number of application services identified by the SPSID.

SPSID: The Sub-PSID field may identify an application-service included in the corresponding PSID. Different from the PSID value, which is a unique value globally, the SPSID may be a unique value in the corresponding PSID. A combination of the SPSID and the PSID may be a unique value globally together and may identify all application-services.

Channel Index: The Channel Index field provides a pointer for $n^{th}$ set of a channel parameter in the channel information segment in the WSA. The Channel Index field may indicate a service channel through which a related application-service opportunity is provided.

Service Info Option Indicator: The Service Info Option Indicator field may indicate whether Service Info WAVE information Element Extension field is existed.

Service Info WAVE information Element Extension: This field is an additional element field which may be optionally included in the service information segment.

PSType: This field may represent a data distribution type when this field value is 00 and represent an application-service ID centric type when this field is 01.

In FIG. 8(a), a data distribution type is represented when a value of service count field is 0, and an application-service ID centric type is represented when a value of service count field is 1 or more.

FIG. 9 illustrates a channel information segment of WAVE Service Advertisement (WSA) according to an embodiment of the present invention.

The channel information segment provides information for a channel used by an application-service which is provided by a device that transmits the WSA. The description for the fields included in the channel information segment is as below.

Channel Info Count: This field indicates the number of instances which are included in the channel information segment.

Operating Class: This field is to identify a specific channel uniquely in a context of a country by the following channel number.

Channel Number: This field indicates the number of channels in relation to accompanying information.

Transmit Power Level: This field indicates Effective Isotropic Radiated Power (EIRP).

Adaptable: This field indicate that a data rate field value is a boundary value or a fixed value.

Data Rate: This field indicates a data rate used in a channel.

Channel Info Option Indicator: The Channel Info Option Indicator field may indicate a presence of Channel Info WAVE information Element Extension field.

Channel Info WAVE information Element Extension: This element is an additional element field which may be optionally included in the channel information segment.

FIG. 10 illustrates a channel information segment of WSA according to an embodiment of the present invention.

FIG. 10 shows an embodiment that uses the structure of FIG. 8(a).

FIG. 10(a) shows a signaling of data-distribution type. That is, a message is not identified for each service, but identified in a unit of service-class by using a PSID only.

FIG. 10(b) to FIG. 10(d) show a signaling of application-service ID centric type.

In FIG. 10(b), the service information segment identifies a service, and this service is identified with PSID=0x10 and SPSID=2.

In FIG. 10(c), the service information segment identifies three services for a single PSID (0x10). The three services are identified by PSID=0x10 and SPSID=2, PSID=0x10 and SPSID=3, and PSID=0x10 and SPSID=3, respectively. In such a case, since there are two identical services identified by PSID=0x10 and SPSID=3, according to an embodiment, a service count field value may be 2. That is, the service count field value may count two services including the service of PSID=0x10 and SPSID=2 and the service of PSID=0x10 and SPSID=3.

In FIG. 10(d), the service information segment identifies services for two PSIDs 0x10 and 0)(50. Three services of which SPSID is 2, 3 and 5 for PSID 0x10 and two services of which SPSID is 1 and 2 for PSID 0x50 may be identified by the service information segment.

The V2X communication apparatus that receives the WSA may receive and process service data immediately by identifying a desired service. In the embodiment of FIG. 10(c) and FIG. 10(d), the V2X communication apparatus may receive and consume at least one service among a plurality of services. Lengths of the service count field and the SPSID field may be changed according to the number of available application-services.

FIG. 11 illustrates Service Advertisement Message (SAM) format according to an embodiment of the present invention.

The SAM of FIG. 11 is another embodiment of the service advertisement information that corresponds to the WSA described in FIG. 7 to FIG. 11. The description for the fields corresponding to the WSA may be applied to each of the fields of the SAM, and the same description is not repeated.

A header of the SAM includes a Version field, an Option Selector field, a SAM ID field, a SAM count field and a SAM Extension field. The description for the WSA header is applied to the fields of the SAM header. A body of the SAM may include at least one of a service information segment, a channel information segment or IPv6 Routing Advertisement field.

The description for the fields included in the service information segment is as below.

Count N: This field indicates the number of ITS-AIDs.

ITS-AID: This field is ITS-AID (Application Identifier) of a variable length that indicates an advertised service. This field may correspond to the PSID of the WSA.

SAID (SubAID): This field is a value that identifies a service in an AID and has a unique value in the AID. This field may correspond to the SPSID of the WSA.

Service Count M: This field indicates the number of SAIDs in ITS-AID.

Channel Index: This field is 5-bit unsigned integer, and the Channel Index field may be used as an entry pointer of the channel information segment.

Option Selectors: This field is 3-bit field and indicates a presence of an option field.

Bit 2='1'b: This field indicates a presence of "System Service" Field.

Bit 1='1'b: This field indicates a presence of "Reply Port Number" Field.

Bit 0='1'b: This field indicates a presence of "Service Infor Extensions" Field.

The description for the fields included in the channel information segment is as below.

Operating Class: IEEE 802.11 Operating Class

Channel Number: IEEE 802.11 Channel Number

Transmit Power level: Transmission power level transmitted in a corresponding channel Adaptable: This field value (corresponding bit) indicates whether Data Rate field value includes a Boundary Value or a Fixed Value.

Option Selectors: A bit that enables to select 8 options

Bit 7~Bit 1: Future use. Set to '0'b

Bit 0='1'b: This field indicates a presence of "Channel Info Extensions" Field.

FIG. 12 illustrates a method for transmitting Service Specific Permission according to an embodiment of the present invention.

The SSP is a service-specific permission and may include an advertisement permission (AdvertisPermissions) and a provider permissions (ProviderPermissions). In the case that both the advertisement permission and the provider permission are not present, a default permission may be applied. As an embodiment, in the case of the advertisement permission, if a specific WSA is advertised to a non-permitted channel, the transmitter that sends it may be a target of misbehavior report. The default SSP in a certificate of WSA signer indicates that the signer has the default permission.

In the case of the provider permission, PSIDs and channel access parameters may be transmitted to a specific channel. A combination of the PSID and the SPSID may be transmitted in combination of PSID+SSP in the certificate. However, the present invention proposes a method of transmitting the SSP by using the WSA.

In embodiment (a) of FIG. 22, SSP information may be included in the service information segment of the WSA. In embodiment (b) of FIG. 22, SSP information may be included in the optional security field. In the case of embodiment (b), the security layer may receive the WSA and add the optional security field thereto, and the optional security field may include the SSP information. The optional security field may further include at least one of the service information count field that represents the number of PSIDs, the PSID field, the service count field that represents the number of SPSIDs or SPSID field, as described in FIG. 10, in addition to the SSP information.

The SSP may indicate whether a transmission of a transmitter is allowed for a specific service. A receiver may determine whether to process a specific message in combination of PSID and SSP. For example, in the case that the SSP indicates that a transmission is allowed for the SPSID of a specific PSID, the receiver may process the message. In the case that the SSP indicates that a transmission is not allowed for the SPSID of a specific PSID, the receiver may discard or bypass the message, not processing the message.

In this embodiment, the receiver may obtain the SSP information without using the security layer/entity. That is, the receiver may obtain the SSP directly, not processing the certificate. Accordingly, the receiver may obtain a transmission permission for a detailed service more rapidly and improve message filtering and processing speed.

FIG. 13 illustrates a method for indicating a compression according to an embodiment of the present invention.

As the amount of service is subdivided and the service becomes diversified, the amount of service advertisement information becomes increased. Accordingly, the present invention proposes a method for supporting a compression function for a service advertisement and signaling whether to compress.

FIG. 13(a) shows the WSA format described above.

FIG. 13(b) shows an embodiment that the WSA includes a compression type field that represents a compression type at the end thereof. The WSA option indicator may further include an additional bit that represents whether the compression type field is present. This bit may also be referred to as compression information or compression bit.

FIG. 13(c) shows an embodiment that whether to compress or compression type is indicated by using WAVE information element extension field.

As shown in FIG. 13, the service advertisement information may include compression information that indicates at least one of whether to compress or compression type of the service advertisement information. As an embodiment, when the compression information is not present, this may indicate that the service advertisement information is not compressed.

FIG. 14 illustrates service advertisement information that supports non-real time service based on an application class or an application-service.

FIG. 14 shows the WAVE Short Message (WSM) format, and the WSM includes the WSA.

The non-real time service advertisement information for supporting the non-real time service may include reserved time information as shown in FIG. 14. In addition, the non-real time service advertisement information may further include the SPSID information so as to support the non-real time service based on the application-service.

The format included in FIG. 14 needs to be reflected on the Management Information Base (MIB) information additionally as shown in FIG. 15 to FIG. 17.

FIG. 15 illustrates additional content of a provider service request table for the application-service for the MIB according to an embodiment of the present invention.

FIG. 16 illustrates additional content of a user service request table for the application-service for the MIB according to an embodiment of the present invention.

FIG. 17 illustrates additional content of a reserved time for non-real time service to the MIB according to an embodiment of the present invention.

FIG. 18 illustrates a method for receiving a hybrid service of a V2X communication apparatus according to an embodiment of the present invention.

In FIG. 18, an OBU may be described as a V2X communication apparatus. In the embodiment of FIG. 18, the application class/area includes application-service A and application-service B.

The OBU may receive the WSA from an RSU provider. The OBU may parse the WSA information and channel-switch it to a service channel of RSU provider A to perform the application-service A and perform data exchange through the corresponding channel. The RSU provider A may also receive data using cloud of back-end.

The application-service B may be provided by a Pedestrian Provider.

Particularly, in the case of the application-service B, data exchange may be performed by using a cellular communication such as 5G. For this, the channel information of the WSA needs to be extended such that other communication protocol such as Long-Term Evolution (LTE) 5G may be used.

FIG. 19 illustrates a method for receiving a non-real time service of a V2X communication apparatus according to an embodiment of the present invention.

As described in FIG. 14, the WSA information may include a reserved time information for providing a service. Further, based on such a reserved time, a scheduled WSA may be transmitted from an RS provider to an OBU. The OBU may exchange service data by channel-switching on a reserved time based on the WSA.

In the provider device and the service communication of a user device according to the present invention, a receiver may process only the application service of a desired application service by receiving it in less count, and accordingly, a service may be provided efficiently. In addition, the present invention may support the application class/area that includes non-real time or hetero application service.

FIG. 20 illustrates a block diagram of a V2X communication apparatus according to an embodiment of the present invention.

In FIG. 30, a V2X communication apparatus 20000 may include a memory 20010, a processor 20020 and an RF unit 20030. As described above, the V2X communication apparatus may be an On Board Unit (OBU) or a Road Side Unit (RSU), or included in the OBU or the RSU.

The RF unit 20030 may be connected to the processor 20020 and transmit/receive radio signal. The RF unit 20030 may transmit a signal of the data received from the processor 20020 by upconverting it to the communication and reception band.

The processor 20020 may be connected to the RF unit 20030 and implement each layer according to an ITS system or a WAVE system. The processor 20020 may be configured to perform an operation according to various embodiments of the present invention according to the drawings and description described above. In addition, at least one of a module, data, program or software that implements an operation of the V2X communication apparatus 20000 according to various embodiments of the present invention described above may be stored in the memory 20010 and executed by the processor 20020.

The memory 20010 is connected to the processor 20020 and stores various types of information for executing the processor 20020. The memory 20010 may be included interior of the processor 20020 or installed exterior to the processor 20020 and connected to the processor 20020 via a known means.

The detailed configuration of the V2X communication apparatus 20000 of FIG. 20 may be implemented such that the various embodiments of the present invention described above may be independently applied or two or more embodiments are applied together. It is described the data reception method according to an embodiment of the present invention of the V2X communication apparatus 20000 shown in FIG. 20 below.

FIG. 21 is a flowchart illustrating a data communication method of a V2X communication apparatus according to an embodiment of the present invention.

A V2X communication apparatus may receive service advertisement information (step, S21010). The V2X communication apparatus may receive the service advertisement information through a control channel for exchanging system management information or the service advertisement information. The service advertisement information announces a service, and the configuration is as described in FIG. 7 to FIG. 14.

The V2X communication apparatus may receive service data (step, S21020). The V2X communication apparatus may receive the service data based on the received service advertisement information. That is, the V2X communication apparatus may access to the channel through which a service is provided based on a channel information segment of the service advertisement information. The service channel is a channel for transmitting and receiving application-service data for providing the service.

The service advertisement information announces a service, and the configuration is as described in FIG. 7 to FIG. 14.

The service advertisement information may include a header and further include at least one of the service information segment or the channel information segment. The header includes option indicator information indicating whether at least one of the service information segment or the channel information segment. The service information segment provides information related to a service, and the channel information segment provides information related to a channel. The service information segment includes provider service ID (PSID) information identifying an application area/class and sub-provider service ID (SPSID) information identifying a service included in the application area/class.

The service information segment further includes service count information representing the number of services identified by the SPSID information. The service advertisement information may further include compression information indicating at least one of whether to compress the service advertisement information or a compression type. In addition, the service advertisement information may further include reserved time information for non-real time service access. The reservation time information may indicate a time for non-real time service access of a service reception apparatus.

The service advertisement information may further include Service Specific Permission (SSP) information representing whether to allow a transmission for the service. The SSP information may be included in the service information segment or the optional security field of the service advertisement information as shown in FIG. 12. The SSP information is used together with the PSID information and the SPSID information and provide faster and efficient message filtering.

The V2X communication apparatus may filter desired service data in a unit of service based on the PSID information and the SPSID information and process the filtered service data, and accordingly, improve a service providing efficiency.

In the present invention, a service provider may transmit a service announcement for a plurality of SPSIDs in a single PSID. In addition, a service provider may transmit a service announcement for a required service among a plurality of SPSIDs in association with a PSID. In such a case, the service announcement information is not transmitted for each service, but a plurality of services may be announced with single service announcement information, and accordingly, communication burden may be decreased. In addition, a service provider may send may compress and send the service announcement, and accordingly, the problem of size increase in transmitting the service announcement for a plurality of services may be solved.

A user device may simplify a process for an application service processing through a detailed service identification. In addition, based on the present invention, information communicated between a service provider and a user and the filtering thereof may be controlled precisely, and accordingly, the amount of communication and the service speed of the entire V2X communication system may be improved. The user device may receive and process only a desired service quickly through the precise filtering. Furthermore, a user device may perform an automatic service filtering in accordance with a situation through permission/priority for each application class/area or application-service.

Based on the present invention, a service may be reserved for each application class/area or application-service, and the corresponding service may be provided through a communication channel of different type. Triggering information for executing/non-executing a service announced including reserved service may be transmitted. Accordingly, a conditional execution for a reservice service is available. A communication type and an addressing scheme according to it may be transmitted so as to perform a service communication through other communication channel as well as DSRC channel.

In an embodiment, the V2X communication apparatus corresponds to a user device provided with a service. However, the V2X communication apparatus is not limited to the user device. The V2X communication apparatus may also correspond to a provider device that provides a service. In the case that the V2X communication apparatus is a provider, the flowchart of FIG. 20 may be applied as below.

The V2X communication apparatus may transmit the service announcement information. In addition, the V2X communication apparatus may also transmit service data. The V2X communication apparatus as a provider device may perform a communication by accessing to a plurality of channels always. That is, in the case of the V2X communication apparatus as a provider, the steps of CCH accessing and SCH accessing are omitted, and the V2X communication apparatus may transmit service data in a SCH while transmitting service advertisement information in a CCH.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

It is understood to those skilled in the art that various alterations and modifications are available in the present invention without departing from the concept or the scope of the present invention. Accordingly, it is intended that the present invention includes alterations and modifications of the present invention provided in the attached claims and the equivalence thereof.

Both of the device and the method invention are described in the present disclosure, and the description of both of the device and the method invention may be applied mutually complementarily.

Various embodiments are described in the Best Mode for Invention.

INDUSTRIAL APPLICABILITY

The present invention is used in a series of vehicle communication field.

It is understood to those skilled in the art that various alterations and modifications are available in the present invention without departing from the concept or the scope of the present invention. Accordingly, it is intended that the present invention includes alterations and modifications of the present invention provided in the attached claims and the equivalence thereof.

The invention claimed is:

1. A method for communicating data of a Vehicle to everything (V2X) communication apparatus, the method comprising:
receiving service advertisement information for announcing a service; and
receiving service data based on the service advertisement information,
wherein the service advertisement information includes a header, a service information segment, and a channel information segment,
wherein the header includes option indicator information indicating the service information segment and the channel information segment are present,
wherein the service information segment provides information related to the service,
wherein the channel information segment provides information related to a channel through which the service is provided, and
wherein the service information segment includes provider service ID (PSID) information identifying an application area and sub-provider service ID (SPSID) information identifying an application-service included in the application area.

2. The method for communicating data of claim 1, wherein the service information segment further includes service count information representing a number of services identified by the SPSID information.

3. The method for communicating data of claim 1, wherein the service advertisement information further includes compression information indicating at least one of whether to compress the service advertisement information and a compression type.

4. The method for communicating data of claim 1, wherein the service advertisement information further includes reserved time information for non-real time service access.

5. The method for communicating data of claim 1, further comprising:
filtering desired service data based on the PSID information and the SPSID information; and
processing the filtered desired service data.

6. The method for communicating data of claim 1, wherein the service advertisement information further includes Service Specific Permission (SSP) information representing whether to allow a transmission for the service.

7. A Vehicle to everything (V2X) communication apparatus, comprising:
a memory configured to store data;
an Radio Frequency (RF) unit configured to transmit and receive a radio signal; and
a processor configured to control the RF unit,
wherein the V2X communication apparatus is configured to:
receive service advertisement information for announcing a service; and
receive service data based on the service advertisement information,
wherein the service advertisement information includes a header, a service information segment, and a channel information segment,
wherein the header includes option indicator information indicating the service information segment and the channel information segment are present,
wherein the service information segment provides information related to the service,
wherein the channel information segment provides information related to a channel through which the service is provided, and
wherein the service information segment includes provider service ID (PSID) information identifying an application area and sub-provider service ID (SPSID) information identifying an application-service included in the application area.

8. The V2X communication apparatus of claim 7, wherein the service information segment further includes service count information representing a number of services identified by the SPSID information.

9. The V2X communication apparatus of claim 7, wherein the service advertisement information further includes compression information indicating at least one of whether to compress the service advertisement information and a compression type.

10. The V2X communication apparatus of claim 7, wherein the service advertisement information further includes reserved time information for non-real time service access.

11. The V2X communication apparatus of claim 7, wherein the V2X communication apparatus filters desired service data based on the PSID information and the SPSID information and processes the filtered desired service data.

12. The V2X communication apparatus of claim 7, wherein the service advertisement information further includes Service Specific Permission (SSP) information representing whether to allow a transmission for the service.

* * * * *